US000001409H

United States Statutory Invention Registration [19]

[11] Reg. Number: H1409

Bixler

[43] Published: Jan. 3, 1995

[54] OPTICAL CORRELATION VELOCITY LOG

[75] Inventor: Robert A. Bixler, San Diego, Calif.

[73] Assignee: The United States of America as represented by the Secretary of the Navy, Washington, D.C.

[21] Appl. No.: 785,392

[22] Filed: Oct. 30, 1991

[51] Int. Cl.[6] ..... G06F 15/64

[52] U.S. Cl. ..... 364/456; 364/443; 364/449; 356/5

[58] Field of Search ..... 358/99, 103, 125, 126; 359/141, 146; 364/443, 444, 456

[56] References Cited

U.S. PATENT DOCUMENTS

| | | | |
|---|---|---|---|
| 2,963,543 | 12/1960 | Link et al. | 358/99 |
| 3,636,330 | 1/1972 | Holeman et al. | 235/150.27 |
| 3,653,769 | 4/1972 | Albright | 356/141 |
| 3,780,220 | 12/1973 | Fugitt et al. | 358/99 |
| 3,810,080 | 5/1974 | Hunter | 340/3 |
| 3,934,077 | 1/1976 | Wood et al. | 178/6 |
| 4,174,524 | 11/1979 | Moran | 358/99 |
| 4,175,269 | 11/1979 | Rebikoff | 358/99 |
| 4,320,397 | 3/1982 | Constantinides | 343/7.5 |
| 4,602,336 | 7/1986 | Brown | 364/456 |
| 4,689,748 | 8/1987 | Hofmann | 364/456 |
| 4,706,119 | 11/1987 | Shatto et al. | 358/99 |
| 4,951,213 | 8/1990 | Baxter et al. | 364/443 |
| 5,162,861 | 11/1992 | Tamburino et al. | 358/125 |
| 5,185,671 | 2/1993 | Lieberman et al. | 358/99 |

*Primary Examiner*—Bernarr E. Gregory

*Attorney, Agent, or Firm*—Harvey Fendelman; Thomas Glenn Keough

[57] ABSTRACT

The invention provides navigational aid for use on board remotely operated or autonomous underwater vehicles. A pulsed laser light signal is directed to the ocean bottom where it is reflected back to a tracking camera located on board the vehicle. The time required for the pulsed light signal to be detected by the camera provides the information from which an on board computer can compute the vehicle's altitude. The camera is range gated and synchronized with the laser. Successive images provided by the reflected laser light are correlated by an image processing program. A correlation function applied to the output of the image processing program provides data from which the computer can calculate the vehicle's movement. An electronic clock provides a time base that is input to the computer in order to derive the vehicle's velocity. Velocity and position data may then be made available for navigation and vehicle control.

16 Claims, 8 Drawing Sheets

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

OPTICAL CORRELATION VELOCITY LOG

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

The navigational requirements of remotely operated or autonomous underwater vehicles (otherwise known as ROV/AUVs) have been provided through the use of doppler sonar, transponder navigation, and inertial navigation. These navigational techniques have been used for missions of relatively short duration (i.e. one day or less). The doppler sonar systems can have problems with large errors at velocities less than 2 knots. Vehicles assigned to longer term missions tend to develop navigation errors due to the long-term drift of the vehicle's navigation system.

There are applications which call for autonomous or semiautonomous vehicles to operate unsupervised for long periods of time with little or no opportunity for navigational updates. These applications require navigation systems which are more accurate and have lower long-term drift than those presently in use today.

There are also applications which require navigation systems that produce very little or no detectable emanations. Doppler sonars in use today produce high levels of detectable acoustic energy, making their use in such situations undesirable.

Correlation techniques were originally invented and successfully adapted in the radar industry. General Electric has successfully adapted them to sonar technology with their Correlation Velocity Log device. The G.E. Correlation Velocity Log is an instrument which measures the speed of a ship or underwater vehicle relative to the ocean bottom. Velocity measurements are obtained from space/time correlation measurements. In the case of the G.E. system an acoustic signal is echoed from the ocean floor and the returning echo signature is then captured with an array of hydrophones. Thus, an acoustic snapshot is captured for the vehicle's position. Successive echoes are received and each received signature is correlated with the previous one. Distance traveled can then be extracted from the position data. These systems are currently in use on ocean going vehicles.

Primitive optical correlation techniques were also briefly pursued by the early missile industry for terrain navigation but the required computational power made it impractical as a navigation aid at that time. Computer technology advances and improved optical sensor resolution now make the application of optical correlation techniques both practical and desirable as an aid to a navigational system.

SUMMARY OF THE INVENTION

This invention, referred to herein as the Optical Correlation Velocity Log (OCVL), is directed generally to the application of correlation techniques to vehicle navigation and, more particularly to ROV/AUV navigation problems. The (OCVL) can provide the accuracy, lower long-term drift, and operational capabilities needed by the navigation systems of ROV/AUVs.

The preferred implementation of this invention utilizes a laser mounted on a vehicle to illuminate the terrain adjacent to the vehicle. A pulsed laser light signal is directed to the terrain surface within the field of view of a tracking camera mounted on the vehicle. When the light reaches the terrain surface it is reflected back to the camera on board the vehicle. The time required for the pulsed light signal to be detected by the camera provides information from which an on board computer can compute the distance of the vehicle from that surface. The camera is range gated and synchronized with the laser. Successive images provided by the reflected laser light are correlated by an image processing program. A correlation function applied to the output of the image processing program provides data from which the computer can calculate the vehicle's movement. An electronic clock provides a time base that is input to the computer's program in order to derive vehicle velocity. Velocity and position data may then be made available for navigation and vehicle control.

Several advantages are obtained by the application of correlation technology to vehicle navigation problems. The navigational accuracy of the OCVL information is dependent on the resolution of the optical sensor used. Modern technology has produced video cameras and other optical sensors with resolutions exceeding 600 lines/inch. Correlation techniques can utilize such detailed optical information to provide navigational information with accuracies far exceeding those of conventional navigation systems. Another advantage provided by an OCVL aided navigation system is the absence of low speed limitations due to internal error and offset. Low speed navigational errors are a significant problem for doppler sonar systems. The navigation data provided by the OCVL has a very small percentage of error even at the lowest vehicle speeds because the inherent sources of error of the OCVL system are very small. Long-term drift, a major problem with other forms of navigational aid, is also minimized by an OCVL aided system because there is no inherent property of correlation which can result in drift. The only drift possible in an OCVL system is introduced by the support electronics, processing electronics, and the internal clock. These sources of error are controllable and therefore it is possible to achieve minimal navigation errors due to drift. A further advantage of an OCVL aided navigation system is that the signals used to obtain the navigational data are virtually undetectable if the vehicle is traveling in an environment that tends to diffuse or disperse light. Any light propagating beyond the vehicle is quickly applications.

In an OCVL aided system, acoustic problems associated with doppler sonars and transponder navigation, such as multipaths, ray bending, susceptibility to acoustic noise, and jamming are no longer sources of navigational error because the navigational data is derived from video image comparisons An object of the invention is to provide accurate data relative to the movement of a vehicle which is useful to augment the accuracy of the vehicle's primary navigation system.

An additional object of the invention is to provide accurate velocity data to aid the navigation system of a vehicle.

Another object of the invention is to provide accurate position data to the navigation system of a vehicle.

Another object of the invention is to obtain velocity and position data for a vehicle in a manner which is not easily detected by present-day surveillance systems.

These and other objects of the invention will become more readily apparent from the ensuing specification when taken in conjunction with the drawings and appended claims.

FIGS. *7a, 7b, 7c, 7d,* are graphical illustrations of a coordinate system as applied to an image field of view.

Figure 8:
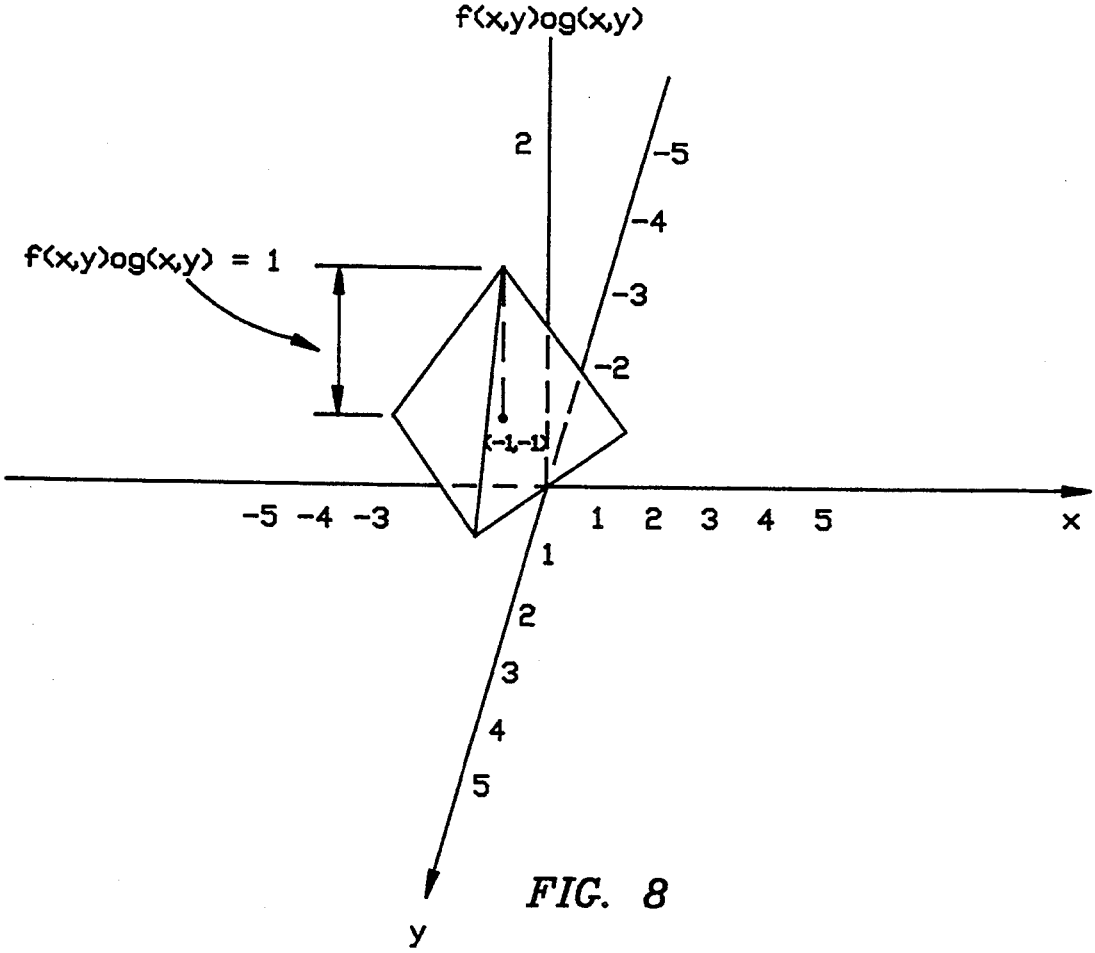

FIG. 8 is a graphic illustration of a correlation function as applied to an image field of view.

Figure 9:
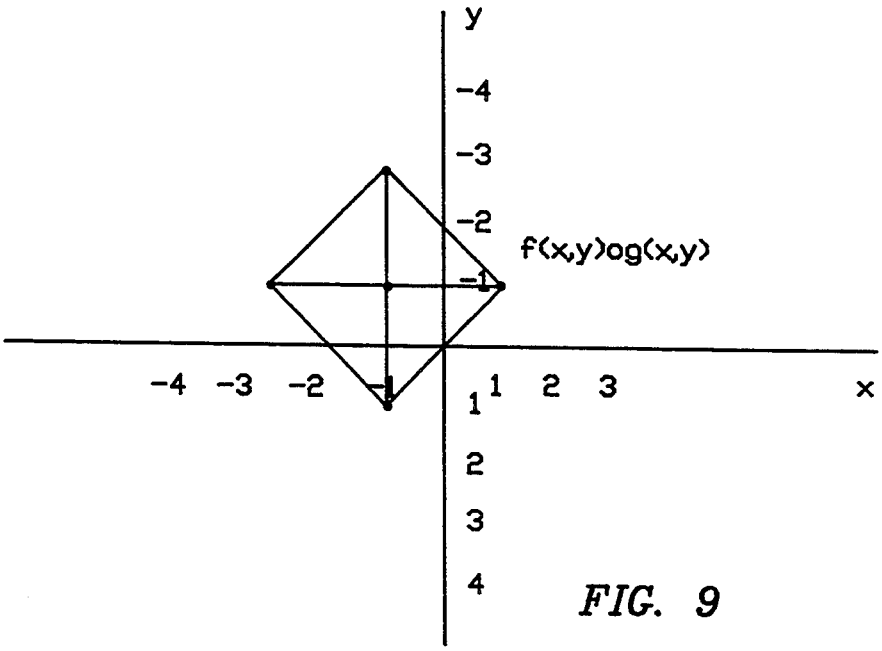

FIG. 9 is graphic illustration of a top view of the correlation function shown in FIG. 8.

Figure 10:
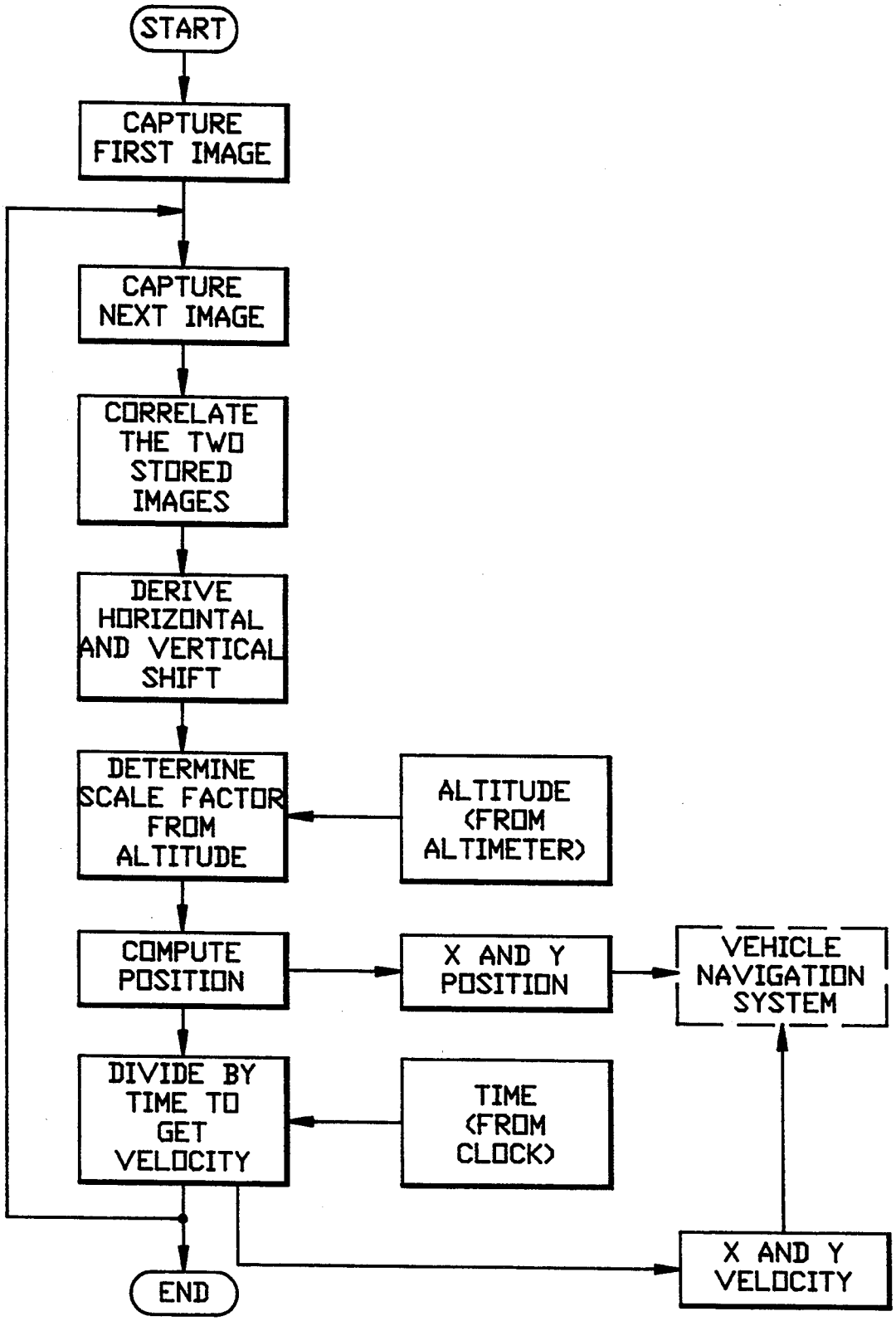

FIG. 10 is a process flow chart for the OCVL system.

DESCRIPTION OF THE PREFERRED EMBODIMENT

Figure 1:
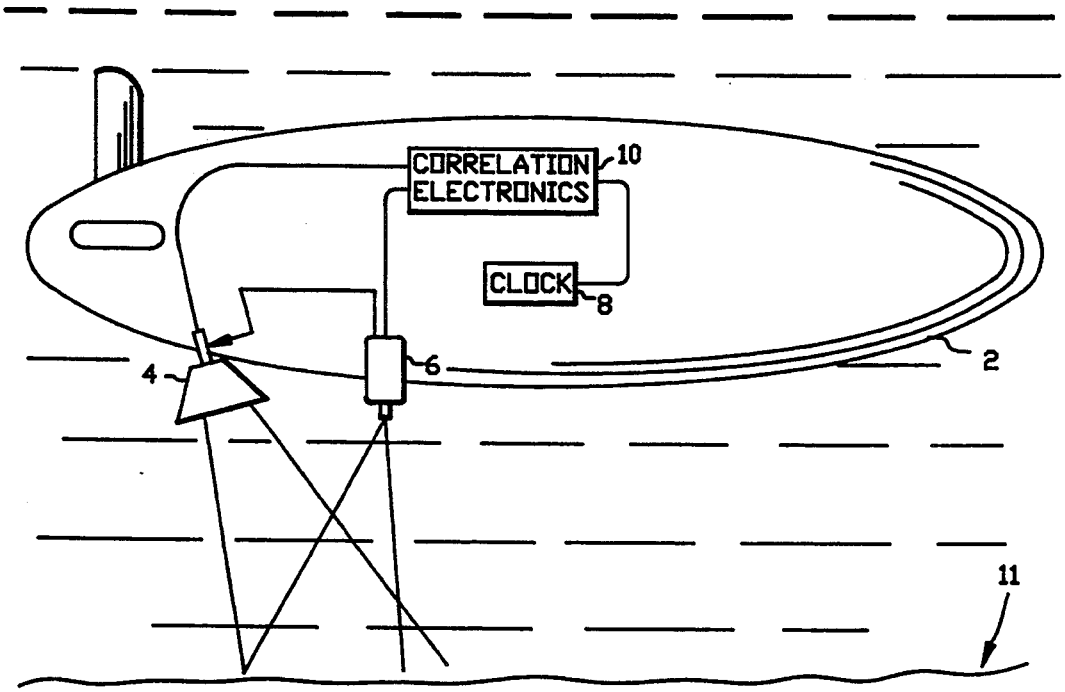
FIG. 1 is a schematic diagram illustrating the geometry of the preferred implementation of the OCVL system on board an underwater vehicle.

Referring now to the drawings, wherein like reference numerals designate like or similar parts throughout the several views, FIG. 1 illustrates the major OCVL components installed on an underwater vehicle 2. Although FIGS. 1 & 2 illustrate the installation of an OCVL system on an underwater vehicle, it is to be understood that the invention could be utilized on various air, land or sea vehicles such as spacecraft, aircraft, automobiles, tanks or ships.

Laser light 4, which may be a Spectra-Physics 161B-08 is mounted on vehicle 2. It is directed an focused to illuminate the field of view of video camera 6, which is also mounted on vehicle 2. Camera 6 may be an Osprey 0E1336. Laser 4 operates in a pulsed light mode. The light pulses are synchronized with camera 6 by real-time clock 8 in conjunction with correlation electronics 10. Clock 8 may be a Kode Model 175. The pulse nature of the light ensures that only a very small volume of water is illuminated at any given time while the pulse travels to the portion of surface 11 within camera 6's field of view and returns. The pulsed laser light minimizes backscatter and enhances the optical signal-to-noise ratio. The use of a pulsed laser light source allows vehicle 2 to operate at a greater distance from surface 11 than the use of a conventional light source. The pulse travel time also provides an indication of the vehicle's distance from surface 11. This is important for determining vehicle 2's geometric relationship to the portion of surface 11 viewed by camera 6. The distance from camera 6 to surface 11 can be calculated by correlation electronics 10 from the timing of the successive images recorded by camera 6. The distance calculations are based on the time it takes for the light from laser 4 to reach surface 11 and return to camera 6.

Figure 2:
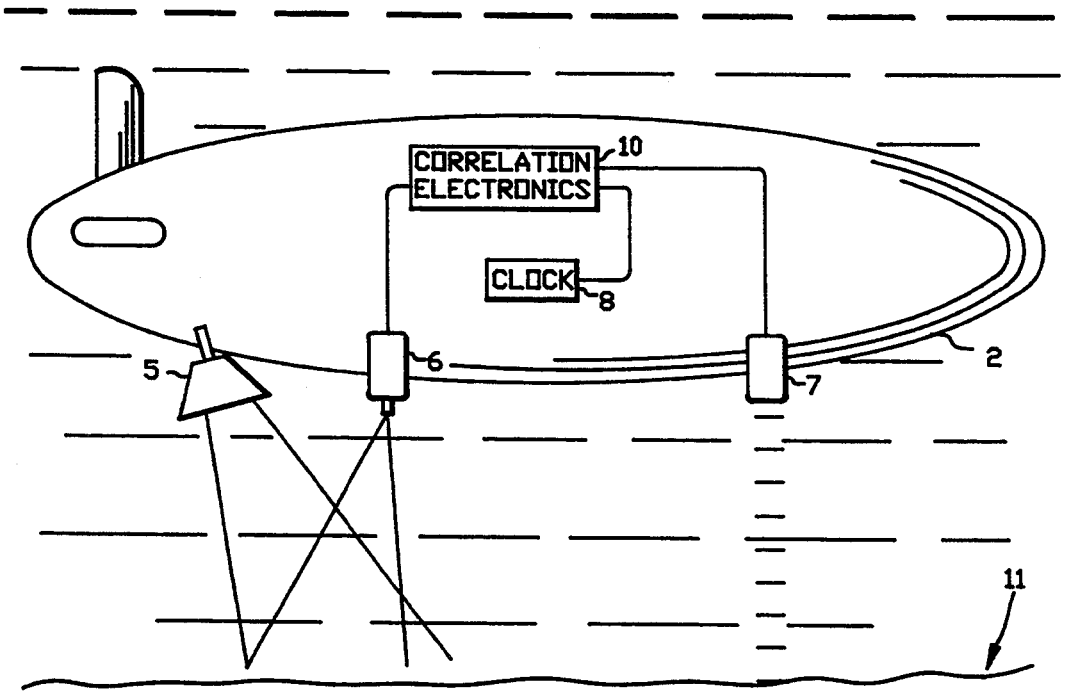
FIG. 2 is a schematic diagram depicting the geometry of an alternate implementation of the OCVL system on board an underwater vehicle.

FIG. 2 illustrates an alternate OCVL system mounted on vehicle 2 which utilizes a conventional floodlight 5, such as a Birns Snooperette. In this system, light 5 is utilized to illuminate surface 11 within the field of view of camera 6. The data for calculating the distance from camera 6 to surface 11 is provided by altimeter 7. Altimeter 7, may be a Mesotech 807-500. The correlation electronics 10 of FIGS. 1 & 2 are identical except for the connection to laser 4 (FIG. 1) and the connections to lamp 5 and altimeter 7 (FIG. 2). The inherent attenuation of light in water limits vehicle 2's operational distance from surface 11 to at most a few tens of fee with the conventional underwater lighting of light 5. Although conventional lighting limits operation to only a short distance from surface 11, this does not necessarily make this concept useless for underwater vehicles. Many tasks call for operations only a few from the bottom of a body of water.

Figure 3:
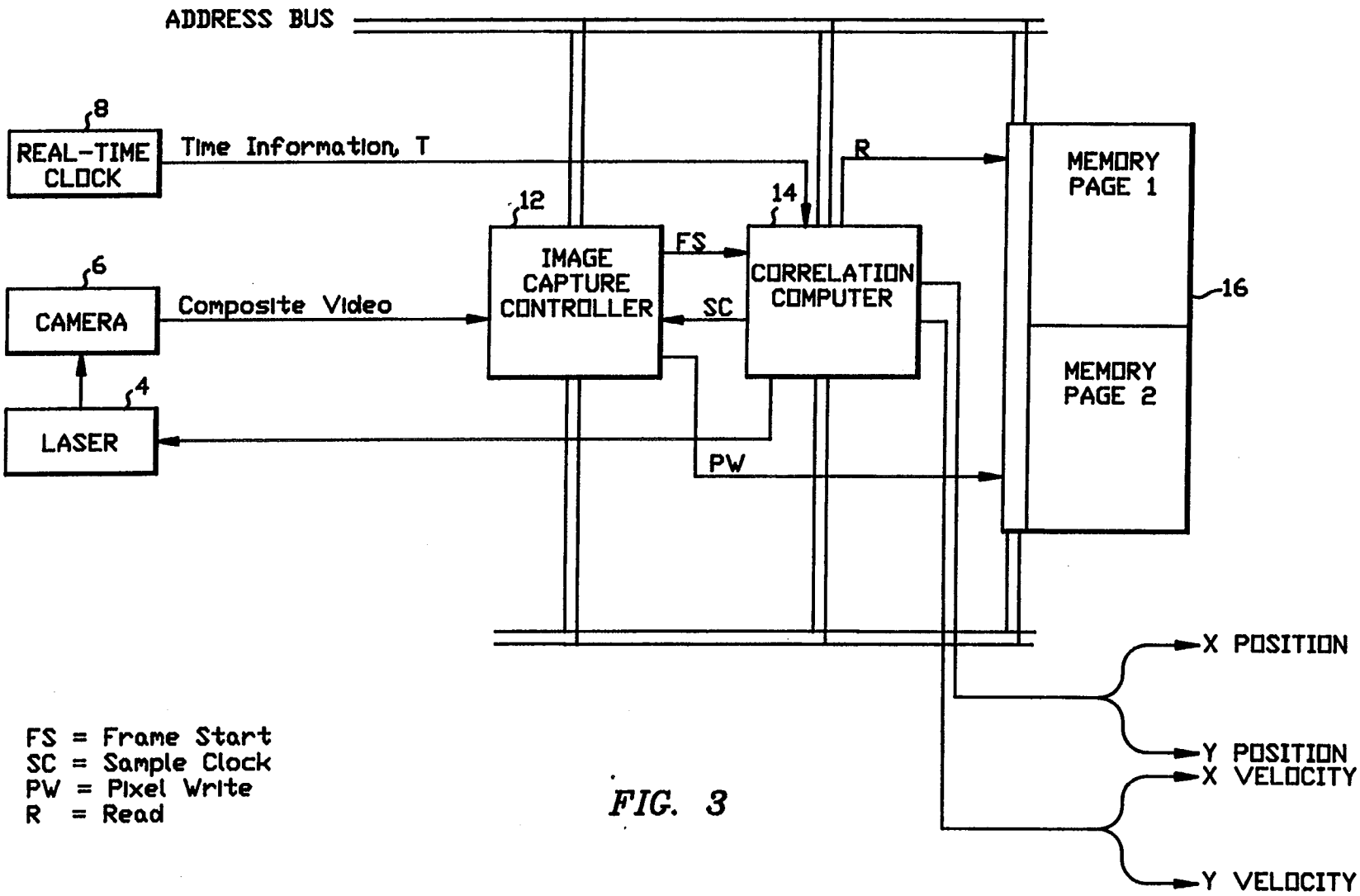
FIG. 3 is a block diagram of the correlation electronics of FIG. 1.

FIG. 3 is a block diagram which further defines the components of correlation electronics 10. It illustrates the relationship of the various OCVL components when the system is implemented using laser 4. Camera 6 tracks the solid surface within its field of view. The light pulses from laser 4, the video from camera 6 and the timing from clock 8 provide the information necessary for computer 14 to calculate the distance from camera 6 to the surface.

Figure 4:
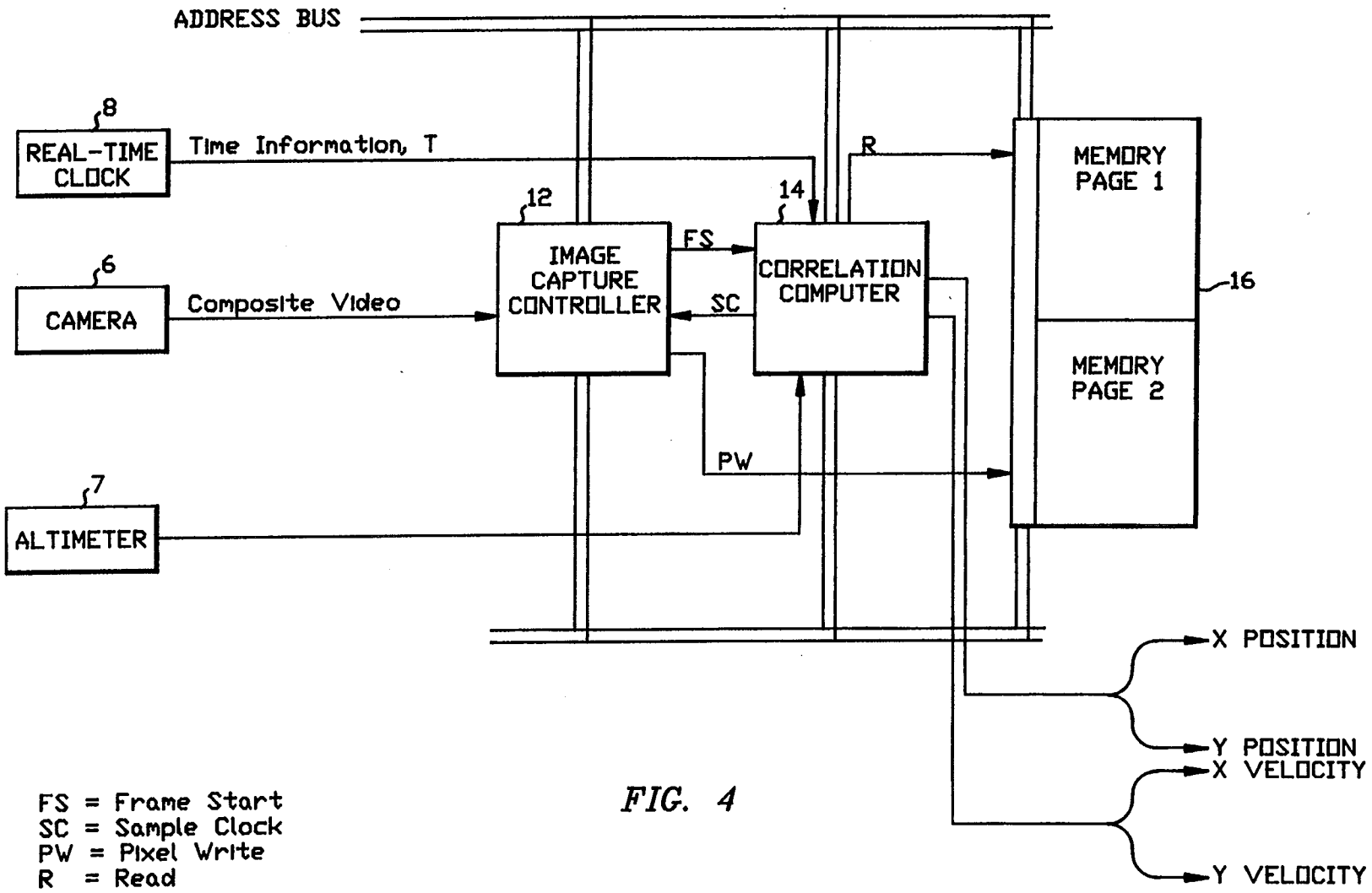
FIG. 4 is a block diagram of the correlation electronics of FIG. 2.

FIG. 4 illustrates the interconnection of the OCVL components when the system is configured as shown in FIG. 2. In the system depicted in FIG. 4, the data for the distance between camera 6 and surface 11 is provided by altimeter 7. The successive video image frames from camera 6 are compared using image capture controller 12 and correlation computer 14. Correlation computer 14 may be an IBM AT. The distance data is used by computer 14 to establish a scale for the relative distances between points in the video image. The surface area captured in the image of the field of view of video camera 6 is proportional to the distance between camera 6 and the surface. By noting how far a reference point has "shifted" with respect to the same reference point's position in a successive frame, it is possible to compute the distance vehicle 2 has moved. Data on the amount of time it takes for vehicle 2 to move from one point to another is provided by internal clock 8. Computer 14 uses the time and distance data to compute the velocity.

Before the images can be compared, in either system (FIG. 3 or FIG. 4) some image processing must be accomplished. The goal of image processing is to eliminate any unnecessary information and use only the information that is most relevant such as the high frequency information associated with edges. Once this is accomplished the correlation can begin. For simplicity, the signal output from the clock 8 is depicted (in FIGS. 3 & 4) as a signal on one line. In fact it consists of several lines which output parallel digital information containing time information and synchronization signals. The same thing applies as well to the signal lines in FIG. 4 for altimeter 7 which is used in the alternate implementation of this invention. With information on the elapsed time and the distance between camera 6 and surface 11 available, correlating successive images will allow computer 14 to calculate vehicle 2's velocity and distance traveled.

Figure 5:
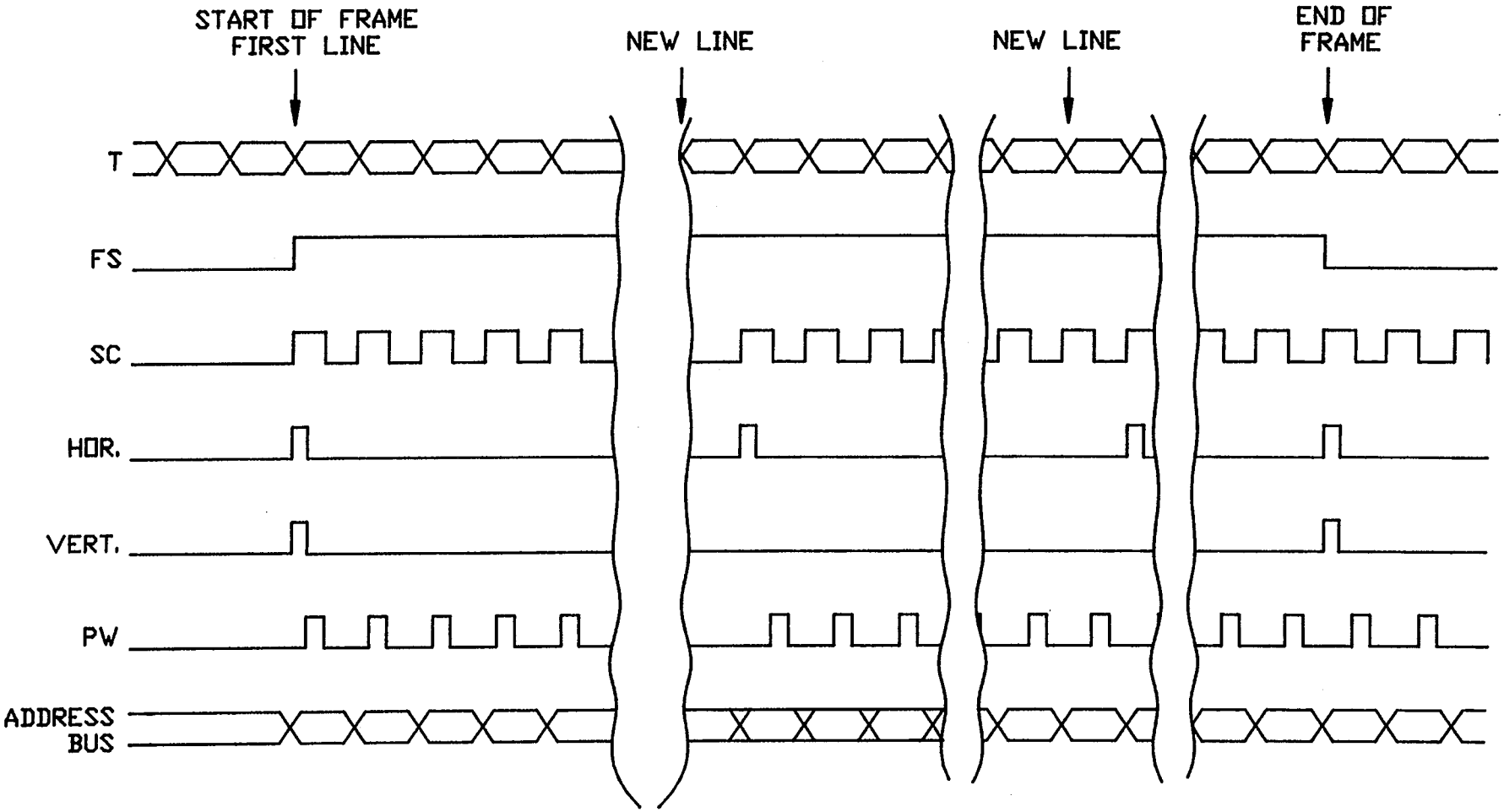
FIG. 5 is a timing diagram for the OCVL system.

Also shown in FIGS. 3 & 4 is the image capture controller 12 described in further detail below. This subsystem is responsible for capturing successive video images in properly formatted digital form and storing them in separate pages of memory 16 which may be an Hitachi HM514800. The correlation computer 14 communicates with controller 12 and determines the video sampling rate by issuing a series of sampling clock signals, SC, but only after controller 12 issues a frame start signal, FS. In effect, FS serves as a frame delimiter while informing the computer 14 that it may begin issuing SC signals. The rate at which frames are captured is programmed into computer 14. Computer 14 monitors clock 8 and after the programmed time interval, T, it begins issuing sampling commands, SC, upon receipt of a start-of-frame indication, FS. The timing relationship of these commands are shown in FIG. 5.

During the interval before another frame is captured, computer 14 correlates two pages of stored information which represents two previous captured images. The velocity and position data are calculated from the results of the correlation function, the calculated distance of camera 6 to the surface, and timing data T from clock 8. When this is done, the contents of memory 16 will be ready for updating as another image is captured and the former memory page is updated with the new image. The cycle can begin anew with the new image being compared with the previous. In this way the two pages of memory are continually being recycled and updated with the former page being updated with the most recent image.

Figure 6:
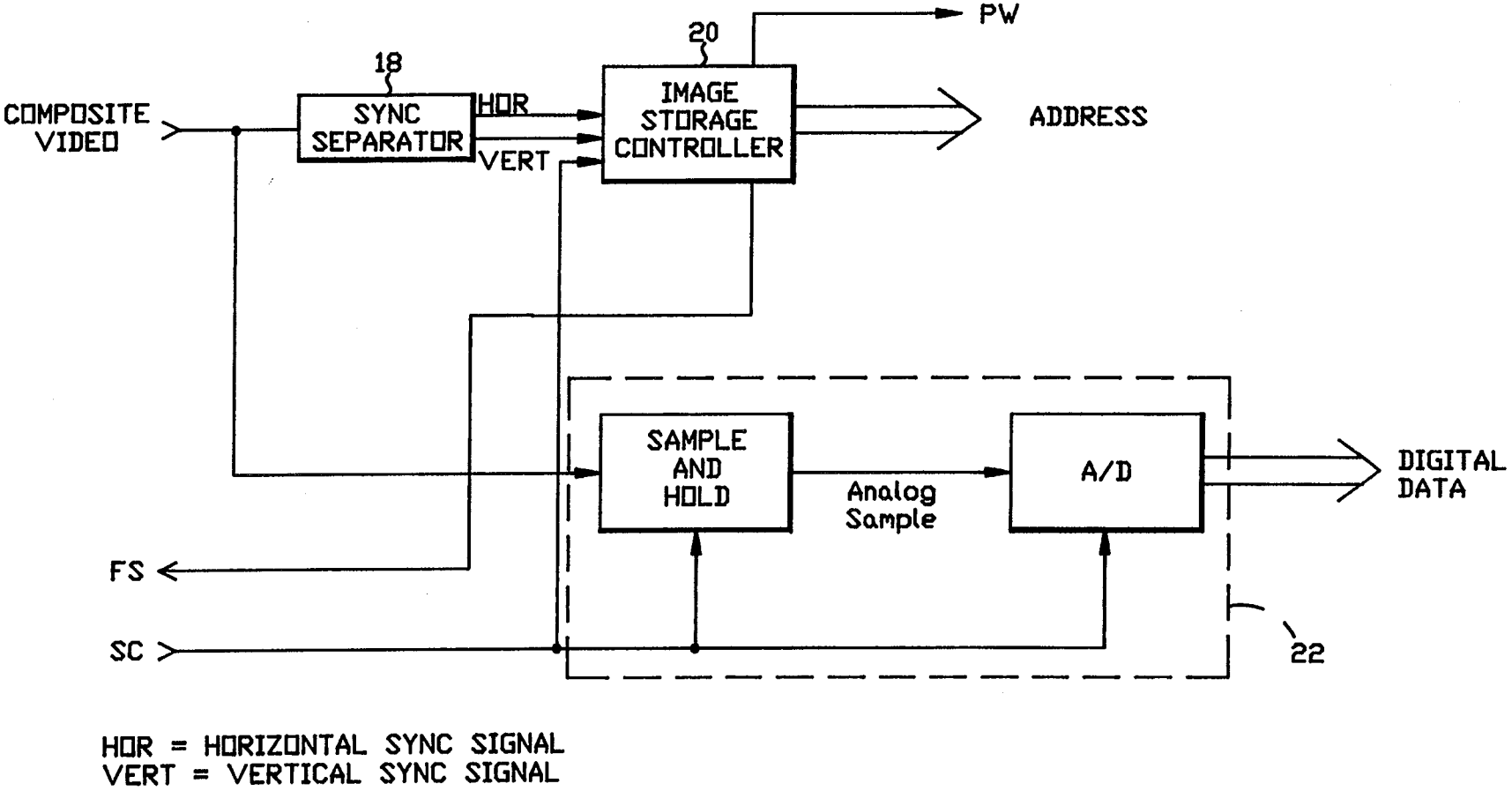
FIG. 6 is a block diagram of the image capture subsystem.
Figure 7A:
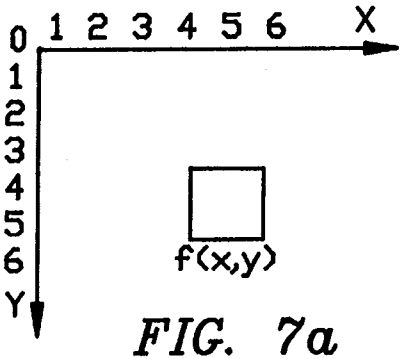
Figure 7B:
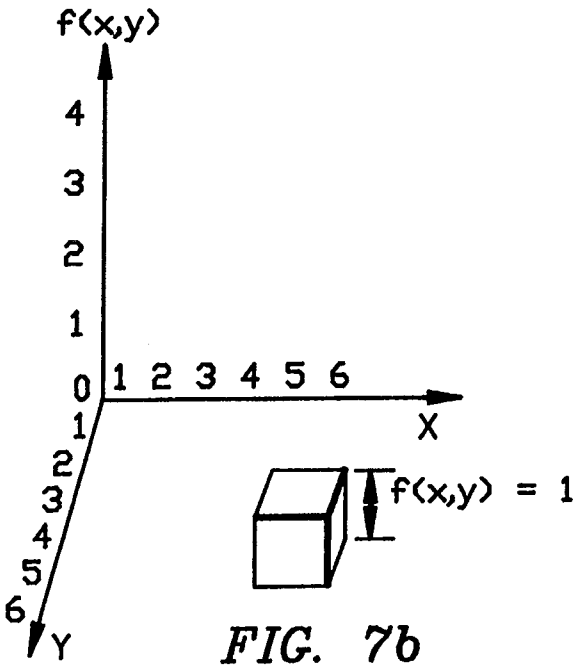
Figure 7C:
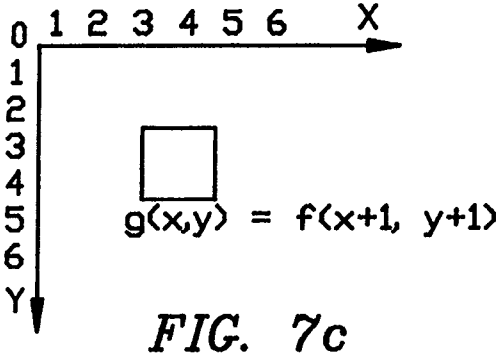
Figure 7D:
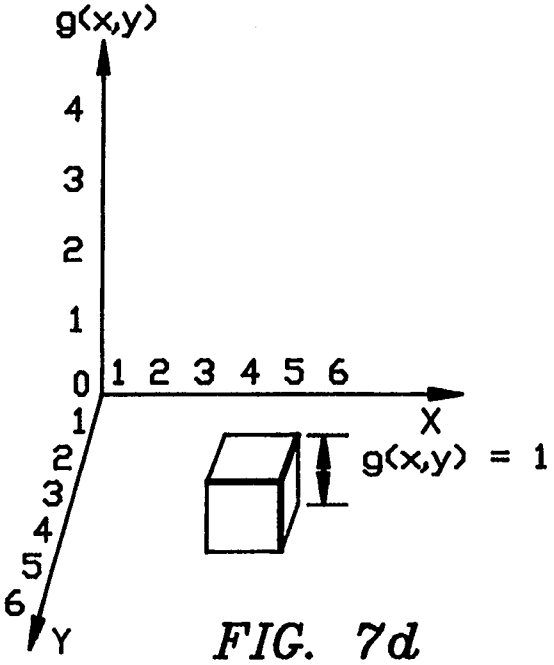

A more thorough understanding of the image capture process can be obtained by examining FIG. 6 which is a block diagram of image capture controller 12. The composite video from camera 6 contains both image information and scanning synchronization signals. These signals can be separated from the video using sync separator 18, which may be a National Semiconductor LM 1881. The output from sync separator 18 provides both horizontal sync signals and vertical sync signals (HOR and VERT respectively). These are combined with the Sampling Commands (SC) from computer 14 by Image Storage Controller 20 to produce a sequence of memory addresses and a write command PW (from pixel write).

Image Storage Controller 20 consists of logic circuitry which generates addresses in the proper sequence for image storage. Addresses are generated and sequenced according to the input signal combinations of HOR, VERT, and SC. Each sampling command (SC) causes the next address to be generated. In addition, when HOR is present the next address to be qenerated represents the beginning of a new line. The presence of VERT indicates the beginning of a new frame. This signifies the start of the first image capture. The next VERT signal indicates the end of the first image and the beginning of the next image. Generation of the third VERT indicates the capture of two successive images. The correlation process can begin at that time.

In order to store the video information in memory 16, the video samples are digitized. This can be implemented by digitizer 22 which may be a Datel ADC-B302E sampling A to D converter. The digitized video samples are stored in the two pages of memory 16 in the proper order and configuration. Each page represents information from exactly one image; and, the address sequence in memory 16 occurs in the same sequence as the corresponding video samples. This configuration is also programmed into computer 14, allowing computer 14 to address each page of memory 16 in a manner necessary for proper correlation. In other words, each stored sample must be addressed in the same sequence that the corresponding analog samples would appear on the original image.

Once the images are stored in the proper sequence and format, the next step is the actual correlation which is done by correlation computer 14. Mathematically, the continuous two-dimensional image correlation function is defined by the following equation:

$$f(x,y) \cdot g(x,y) = \int_{-\infty}^{\infty} \int f(a,b) g(x+a, y+b)\, da\, db \qquad \text{(eq. 1)}$$

where f(x,y) and g(x,y) are the two images to be correlated. For the application under discussion g(x,y) is a shifted version of f(x,y):

$$g(x,y) = f(x-c, y-d) \qquad \text{(eq. 2)}$$

where c and d are the respective horizontal and vertical distances that g(x,y) is shifted from f(x,y).

When two images are correlated, a mathematical relationship between them is generated (illustrated in FIGS. 7, 8 & 9) known as a correlation function. The correlation function describes the degree of similarity as the two images are shifted with respect to each other with the independent variables being the amount of shift. At the points of greatest coincidence (FIGS. 8 & 9) peaks in the correlation function are generated with a value indicating the degree of similarity. If the two images are merely shifted versions of each other, a correlation peak will occur at the location corresponding to the shift. This amount of shift is what is used to compute the displacement because it corresponds to the actual displacement of the vehicle.

Two important components are required before velocity can be computed from image correlation. The first is a time reference. Velocity is computed by dividing distance traveled by the elapsed time. Therefore a means of establishing elapsed time is necessary. This is easily done using the electronic real-time clock 8. The second component is the distance from camera 6 to the surface imaged. The image data captured by the camera 6 is a proportional version of the actual terrain within camera 6's field of view. To determine the scale of distances between data points within the image requires some knowledge of camera 6's optics and the distance camera 6 is from the surface being viewed. The camera 6 optics are known from its specifications. The distance from the surface is measured by acoustic echo altimeter 7 or information derived from the timing of pulsed laser light source 4. In either case, the distance information will be used to determine the scale for the image data.

FIGS. *7a* and *7b* illustrate a very simple image. A shifted version of the image is depicted in FIGS. *7c* and *7d*. Equation 2 applies to FIGS. *7c* and *7d* when shifts c and d equal −1. The amplitude of the image represents the brightness value of the scene which, in this case, is a square with an arbitrary brightness value of 1. Graphic representations of the correlation function are shown in FIGS. 8 & 9. FIG. 9 depicts the function as viewed from the top. In this example, shown in FIGS. 8 and 9, the function is a square pyramid with height equal to 1 and its vertex located at x and y coordinates of −1. These positions are the values c and d by which f(x,y) is shifted to result in g(x,y). In other words, the location of the correlation function peak directly yields the amount by which one image is shifted with respect to its original. This will also be the case with the much more complicated images of the ocean bottom.

In the OCVL system the correlation is done using discrete digital samples of the image. As an example, a sampled image stored in one page of memory is represented by f(x,y) and its shifted version is represented by g(x,y)=f(x−c,y−d) in the other page. The discrete correlation function of these two images is:

$$f(x,y) \cdot g(x,y) = \sum_{m=0}^{M-1} \sum_{n=0}^{N-1} f(m,n)g(x+m,y+n) \quad \text{(eq. 3)}$$

for x=0,1,2,3 . . . M−1 and y=0,1,2,3 . . . N−1. Using this equation, results similar to those in the continuous case will be obtained, thus yielding correlation functions. The peak can be located with a straightforward algorithm, thus yielding position information.

The amount of shift for one image with respect to another can be used to determine the distance and direction the camera traveled between frames because the altitude information yields the necessary scale factor between the video image and actual surface within the field of view. Also, image timing information combined with the distance and direction data produces the velocity.

The discrete correlation function is a well-known function used for digital image processing. Various algorithms have been developed for its software implementation and can be used to program correlation computer 14.

A flow chart of the OCVL system process is presented in FIG. 10. As described above the first step is the capture of the first image. Following the capture of the first image and its subsequent storage in the first page of memory, the next image is captured and stored in the next page of memory. The computer then correlates the two images using the algorithm which implements equation 3. The horizontal and vertical shifts, c and d respectively, are derived from the location of the correlation function peak. Altitude information, from either the altimeter or the pulsed laser, determines the geometry and scale factor. Using the altimeter information, the position change between each image is computed. Coordinates X and Y are computed as the new position relative to the last update. These new X and Y position coordinates are provided as outputs from the OCVL to the vehicle 2's navigation system. The new computed X and Y position is divided by the time interval between fixes using the information derived from the system clock. This results in velocity in the X and Y directions. The new X and Y velocity data is also provided to the navigation system. The overall cycle repeats itself as the next image is captured and the process begins anew.

The preceding description presented the fundamental operational principles for a working OCVL. One important refinement is the need for discriminating between multiple correlation peaks when they arise as with periodic or semiperiodic features. In instances where surface 11 has uniforn periodic variations such as the periodicities of sand waves on the ocean bottom, multiple correlation peaks will be produced resulting in ambiguities. This problem is addressed using predictive filtering techniques in the computer 14 program which eliminate ambiguities by computing solution estimates based on past vehicle track history and vehicle dynamics. This effectively forces the correlation computer 14 to look for solutions only in the relevant regions of the correlation function. In this way the correlation peak is located without ambiguity and the corresponding distance is determined. This technique is well-known in the field of image correlation processing and is included in the programming of computer 14.

Operation and use of the OCVL is straightforward and is illustrated by way of example in FIGS. 1 & 2. In this example camera 6 is mounted on the bottom of underwater vehicle 2 and pointed straight down. After assurance that it has an unrestricted field of view it is permanently fixed in this position. To continue the example, illumination in the form of underwater lamp 5 or pulsed laser 4 (if greater altitude is required) is also installed on the bottom of vehicle 2 and directed downward so that camera 6's field of view will be illuminated. When vehicle 2 is on station and ready to begin tracking the bottom, the OCVL is initialized by the operator (or vehicle navigation system if autonomous) and the process begins. Position and velocity, both forward-and-reverse and right or left are then made available as needed for navigation needs and vehicle control if it is autonomous, or are displayed on panel readouts if it is operator controlled.

Obviously, many modifications and variations of the present invention are possible in the light of the above teachings. It is therefore to be understood that within the scope of the appended claims, the invention may be practiced otherwise than as specifically described.

I claim:

1. A system to aid the navigation of a vehicle comprising:

means mounted on said vehicle for providing a time reference;

means mounted on said vehicle for measuring the distance of said vehicle from a surface;

means mounted on said vehicle for providing an optical recording of sequential images of said surface as a function of said time reference; and means mounted on said vehicle, coupled to said time reference means, said measuring means and said optical recording means for providing vehicle position and velocity data as a function of said time reference, said distance and said sequential images.

2. A system as recited in claim 1, in which:

said means for providing a time reference is a real time digital clock.

3. A system as recited in claim 1, in which:

said optical recording means is a television camera.

4. A system as recited in claim 1, in which:

a laser is mounted on said vehicle to illuminate said surface within the field of view of said optical recording means.

5. A system as recited in claim 1, in which:

a floodlight is mounted on said vehicle to illuminate said surface within the field of view of said optical recording means.

6. A system as recited in claim 1, in which:

said means for providing said vehicle position and velocity data is a computer, programmed to correlate the sequential information provided by said optical recording means.

7. A system as recited in claim 1, in which said measuring means comprises;

a laser, connected to said time reference means, mounted on said vehicle to illuminate said surface within the field of view of said optical recording means; and a computer, connected to said laser, said time reference means and said optical recording means, programmed to calculate the distance of said vehicle to said surface from data based on the time it takes a pulsed light signal from said laser to reach said surface and reflect back to said optical recording means.

8. A system as recited in claim 1, in which:

said measuring means is an acoustic echo altimeter.

9. A system as recited in claim 1, wherein:

said vehicle is a remotely operated underwater vehicle.

10. A system as recited in claim 1, wherein:

said vehicle is a autonomous underwater vehicle.

11. A system on a vehicle to aid navigation comprising:

a real time digital clock;

a television camera;

a laser for illuminating the field of view of said camera; and a computer, coupled to said clock, said camera and said laser, programmed to provide velocity and position information to the navigation system of said vehicle from data received from said clock and said camera.

12. A system as recited in claim 11 wherein said vehicle is an autonomous underwater vehicle.

13. A system as recited in claim 11 wherein said vehicle is a remotely operated underwater vehicle.

14. A system on a vehicle to aid navigation comprising:

a real time digital clock;

a television camera;

a flood lamp for illuminating the field of view of said camera;

an altimeter; and a computer, coupled to said clock, said camera, and said altimeter, programmed to provide velocity and position information to the navigation system of said vehicle from data received from said clock, said camera, and said altimeter.

15. A system as recited in claim 14 in which said vehicle is an autonomous underwater vehicle.

16. A system as recited in claim 14 in which the vehicle is a remotely operated underwater vehicle.

* * * * *